(12) United States Patent
Allison et al.

(10) Patent No.: US 10,922,154 B1
(45) Date of Patent: Feb. 16, 2021

(54) SYSTEMS AND METHODS FOR INTER-PROCESS COMMUNICATION WITHIN A ROBOT

(71) Applicant: X Development LLC, Mountain View, CA (US)

(72) Inventors: David Allison, Mountain View, CA (US); Nathan Pooley, Mountain View, CA (US); Craig Latimer, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/890,354

(22) Filed: Jun. 2, 2020

(51) Int. Cl.
*G06F 9/44* (2018.01)
*G06F 9/54* (2006.01)

(52) U.S. Cl.
CPC .............. *G06F 9/544* (2013.01); *G06F 9/546* (2013.01)

(58) Field of Classification Search
CPC ...................................................... G06F 9/544
USPC .......................................................... 719/330
See application file for complete search history.

(56) References Cited

U.S. PATENT DOCUMENTS

| | | | |
|---|---|---|---|
| 7,080,385 B1 * | 7/2006 | Collison ................. | G06F 9/542 719/310 |
| 7,478,402 B2 * | 1/2009 | Christensen ............ | G06F 9/546 709/231 |
| 8,452,448 B2 | 5/2013 | Pack et al. | |
| 9,984,112 B1 * | 5/2018 | Wang ....................... | G06F 16/11 |
| 2004/0153511 A1 * | 8/2004 | Maynard ................. | G06F 9/546 709/206 |
| 2009/0064177 A1 * | 3/2009 | Bauer ...................... | G06F 9/545 719/313 |
| 2017/0139411 A1 | 5/2017 | Hartung et al. | |

FOREIGN PATENT DOCUMENTS

EP 3200132 B1 10/2019

\* cited by examiner

*Primary Examiner* — Timothy A Mudrick
(74) *Attorney, Agent, or Firm* — McDonnell Boehnen Hulbert & Berghoff LLP

(57) ABSTRACT

A method includes creating a publisher configured to send messages over a channel having a shared memory. The method includes creating at least one subscriber configured to receive the messages over the channel by sequentially referencing memory slots of the plurality of memory slots. The method includes determining that the next sequential memory slot is currently referenced by a subscriber. The method includes delaying sending the message by the publisher based on determining that the next sequential memory slot is currently referenced by the subscriber. The method includes receiving an event trigger indicative of message reading by the subscriber. The method includes, responsive to receiving the event trigger, determining that the next sequential memory slot is not currently referenced. The method includes sending the message to the next sequential memory slot based on determining that the next sequential memory slot is not currently referenced.

20 Claims, 13 Drawing Sheets

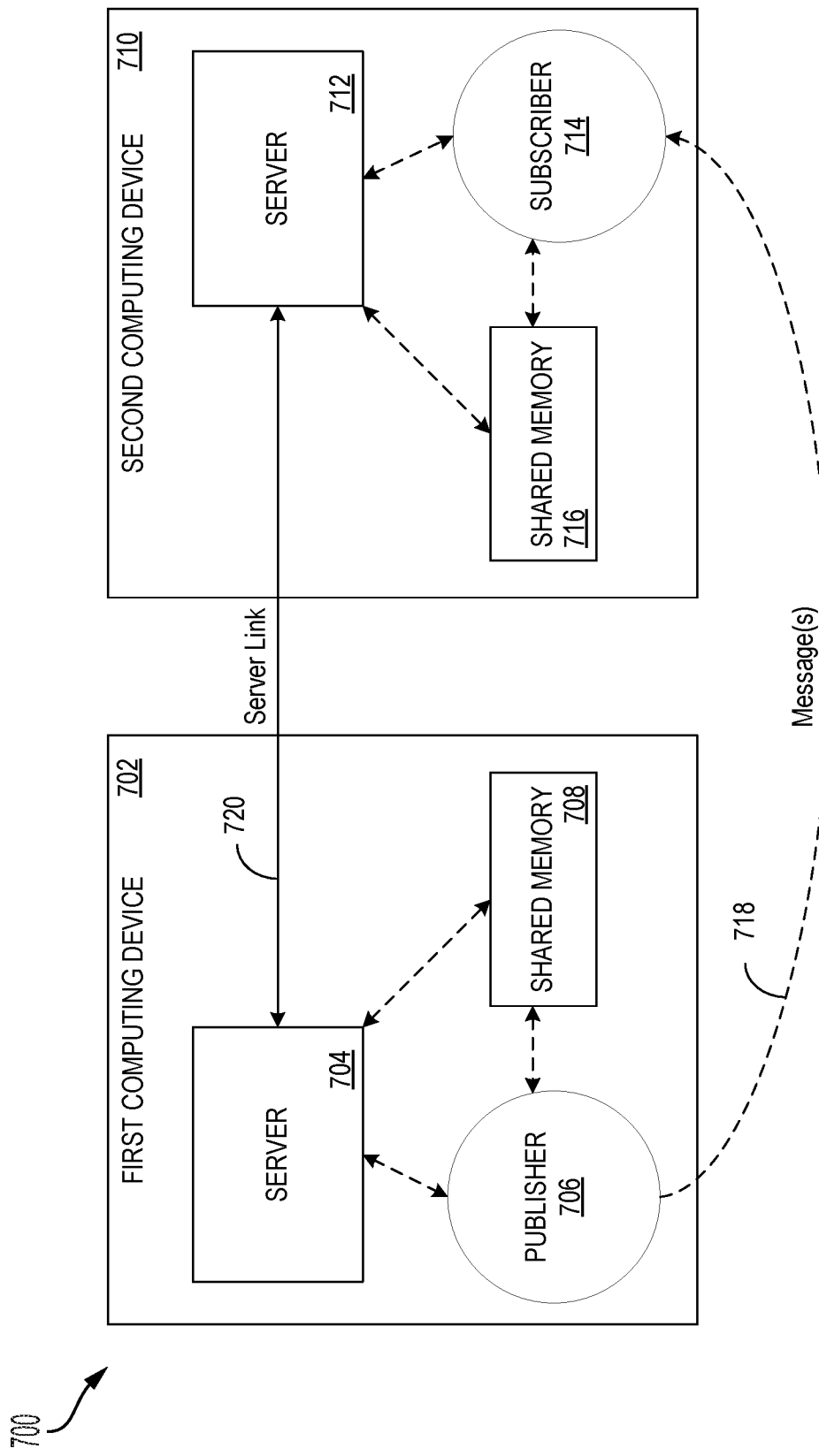

SYSTEMS AND METHODS FOR INTER-PROCESS COMMUNICATION WITHIN A ROBOT

BACKGROUND

A robot may have several components that communicate in order to facilitate operations in the robot. For example, a central controller may be a communications server of the robot that coordinates this communication using an inter-process communication (IPC) protocol. In such protocols, publishers are designated as communication nodes that send messages to other nodes in the system, and subscribers are designated as communication nodes that receive messages from one or more publishers. While a robot operates, certain subscribers might be crucial to performance of given tasks, and may require prompt and complete information in order to facilitate the task.

SUMMARY

Example embodiments involve communications within a robot. A computing device within the robot can be configured to create publishers and subscribers for sending and receiving messages respectively. Example embodiments further relate to ensuring that one or more subscribers read each message sent by a corresponding publisher. Different types of subscribers within the robot may communicate with the publisher in different ways.

In an embodiment, a method is provided. The method includes creating a publisher configured to send messages over a channel having a shared memory. The shared memory comprises a plurality of sequentially-related memory slots, and wherein each sent message sequentially occupies a memory slot of the plurality of memory slots. The method includes creating at least one subscriber configured to receive the messages over the channel by sequentially referencing memory slots of the plurality of memory slots. The method includes determining, at a first attempt for sending a message by the publisher, based on an indicator associated with a next sequential memory slot in the plurality of memory slots, that the next sequential memory slot is currently referenced by a subscriber. The method includes delaying sending the message by the publisher based on determining that the next sequential memory slot is currently referenced by the subscriber. The method includes receiving an event trigger indicative of message reading by the subscriber. The method includes, responsive to receiving the event trigger, determining, at a second attempt for sending the message by the publisher, based on the indicator associated with the next sequential memory slot, that the next sequential memory slot is not currently referenced by any of the at least one subscriber. The method includes sending, by the publisher, the message to the next sequential memory slot based on determining that the next sequential memory slot is not currently referenced by any of the at least one subscriber.

In another embodiment, a system is provided. The system includes one or more processors, a non-transitory computer readable medium, and program instructions stored on the non-transitory computer readable medium and executable by the one or more processors to create a publisher configured to send messages over a channel having a shared memory. The shared memory includes a plurality of sequentially-related memory slots, and each sent message sequentially occupies a memory slot of the plurality of memory slots. The program instructions are executable to create at least one subscriber configured to receive the messages over the channel by sequentially referencing memory slots of the plurality of memory slots. The program instructions are executable to determine, at a first attempt for sending a message by the publisher, based on an indicator associated with a next sequential memory slot in the plurality of memory slots, that the next sequential memory slot is currently referenced by a subscriber. The program instructions are executable to delay sending the message by the publisher based on determining that the next sequential memory slot is currently referenced by the subscriber. The program instructions are executable to receive an event trigger indicative of message reading by the subscriber. The program instructions are executable to, responsive to receiving the event trigger, determine, at a second attempt for sending the message by the publisher, based on the indicator associated with the next sequential memory slot, that the next sequential memory slot is not currently referenced by any of the at least one subscriber. The program instructions are executable to send, by the publisher, the message to the next sequential memory slot based on determining that the next sequential memory slot is not currently referenced by any of the at least one subscriber.

In a further embodiment, a non-transitory computer readable medium is provided. The non-transitory computer readable medium has stored therein instructions executable by one or more processors to cause a computing system to perform functions. The functions include creating a publisher configured to send messages over a channel having a shared memory. The shared memory comprises a plurality of sequentially-related memory slots, and wherein each sent message sequentially occupies a memory slot of the plurality of memory slots. The functions include creating at least one subscriber configured to receive the messages over the channel by sequentially referencing memory slots of the plurality of memory slots. The functions include determining, at a first attempt for sending a message by the publisher, based on an indicator associated with a next sequential memory slot in the plurality of memory slots, that the next sequential memory slot is currently referenced by a subscriber. The functions include delaying sending the message by the publisher based on determining that the next sequential memory slot is currently referenced by the subscriber. The functions include receiving an event trigger indicative of message reading by the subscriber. The functions include, responsive to receiving the event trigger, determining, at a second attempt for sending the message by the publisher, based on the indicator associated with the next sequential memory slot, that the next sequential memory slot is not currently referenced by any of the at least one subscriber. The functions include sending, by the publisher, the message to the next sequential memory slot based on determining that the next sequential memory slot is not currently referenced by any of the at least one subscriber.

In another embodiment, a system is provided. The system includes means for creating a publisher configured to send messages over a channel having a shared memory. The shared memory comprises a plurality of sequentially-related memory slots, and wherein each sent message sequentially occupies a memory slot of the plurality of memory slots. The system includes means for creating at least one subscriber configured to receive the messages over the channel by sequentially referencing memory slots of the plurality of memory slots. The system includes means for determining, at a first attempt for sending a message by the publisher, based on an indicator associated with a next sequential memory slot in the plurality of memory slots, that the next sequential memory slot is currently referenced by a subscriber. The system includes means for delaying sending the message by the publisher based on determining that the next sequential memory slot is currently referenced by the subscriber. The system includes means for receiving an event trigger indicative of message reading by the subscriber. The system includes means for, responsive to receiving the event trigger, determining, at a second attempt for sending the message by the publisher, based on the indicator associated with the next sequential memory slot, that the next sequential memory slot is not currently referenced by any of the at least one subscriber. The system includes means for sending, by the publisher, the message to the next sequential memory slot based on determining that the next sequential memory slot is not currently referenced by any of the at least one subscriber.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 7 is a block diagram of a communication session between computing devices, in accordance with example embodiments.

DETAILED DESCRIPTION

Figure 1:
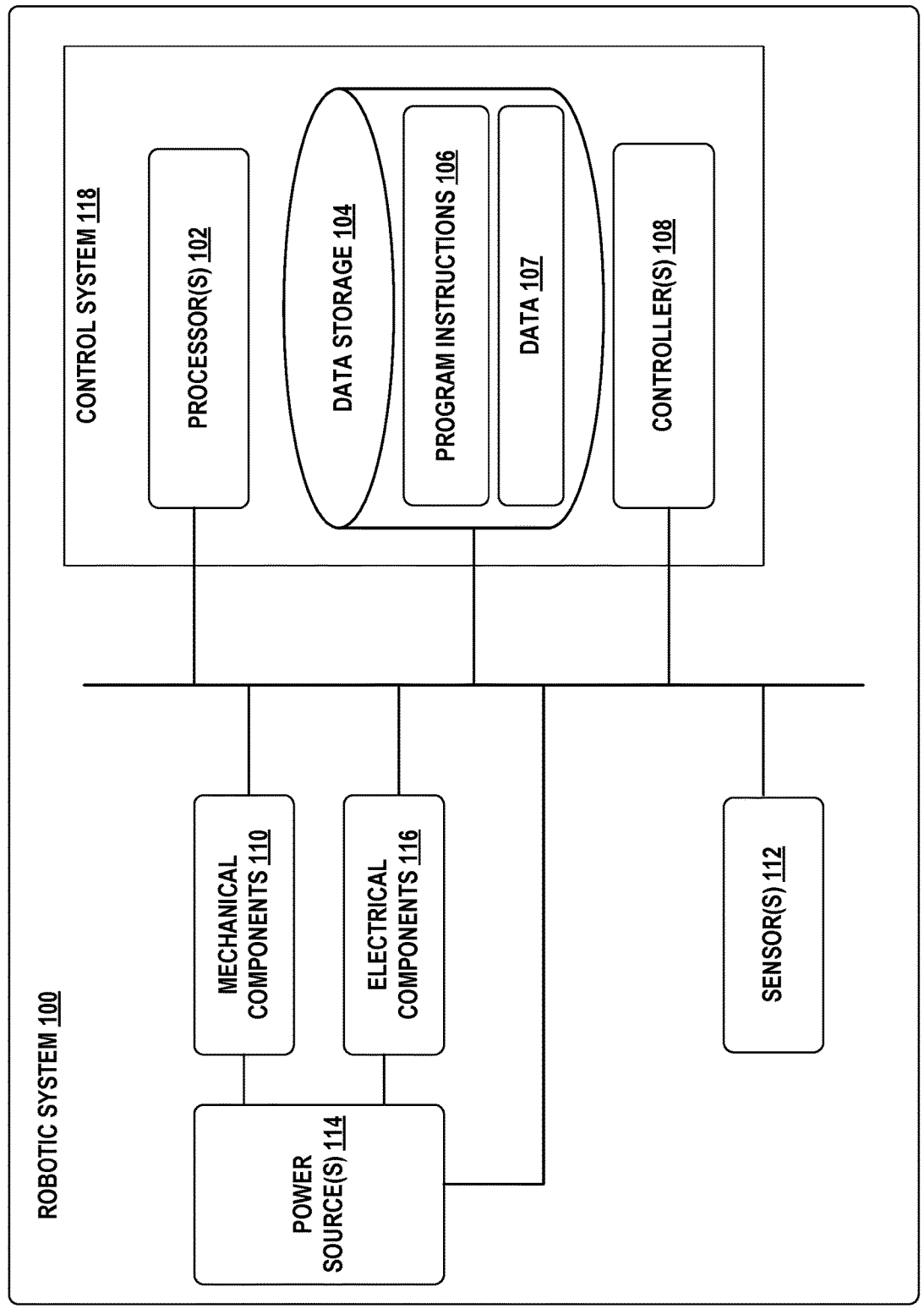
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For the purposes of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Overview

Example embodiments may include or otherwise relate to methods and systems that may be used to facilitate communication between publishers and subscribers in accordance with a communication protocol (e.g., an IPC protocol). In particular, the methods and systems may be implemented in a communication system for a robot.

When instantiating a task for the robot, a server can create a publisher configured to send messages over a channel. The channel can include a shared memory having a plurality of sequentially-related memory slots, and each memory slot can be configured to store a message sent by the publisher. At least one subscriber can be created to read messages sent over the channel by the publisher. Within examples, a protocol is described that facilitates "reliable" communication between the publisher and at least one subscriber. As used herein, the term "reliable" refers to communication between a publisher and a subscriber in which the subscriber is substantially guaranteed to read each message sent by the publisher.

To facilitate reliable communication between the publisher and the at least one subscriber, the sequentially-related memory slots are referred to in sequence by both the publisher and the subscriber. For example, the publisher may send a message to a first sequential slot at a first time, send a second message to a second sequential slot at a second time, and so on. Similarly, a given subscriber may read messages by referencing the first sequential slot while reading the first message, referencing the second sequential slot while reading the second message, and so on. For both the publisher and the subscriber, the memory slots can be referenced in a cyclical manner such that the last memory slot (e.g., an n-th memory slot in a shared memory with n memory slots) is followed by the first memory slot. Because the publisher sends messages before the subscriber reads them, the subscriber can follow the publisher through the sequential memory slots.

In order to ensure that the publisher does not overwrite a memory slot containing a message that has not yet been read by a subscriber (e.g., if sending the messages occurs at a faster rate than the subscriber reading the messages), an indicator can be incremented at each sequential memory slot while a subscriber is reading a message, indicating that the publisher should delay sending the next message to that memory slot. In this manner, if the publisher loops through the sequential memory slots before the subscriber can read all of the previously stored messages, the publisher will automatically delay sending the next message, and thereby ensure that the subscriber can read each message.

Delaying sending the next message in a series of messages can slow communication speed even as it ensures complete information being obtained by each subscriber. Accordingly, the subscribers can remove backpressure from unsent messages on the channel by triggering the next message upon completing a read operation. For example, the subscriber can send an event trigger to the publisher after reading a current message to indicate that the current message has been read. This causes the publisher to make another attempt at sending the next message. If no other subscribers are reading the current memory slot, the next message can be stored in the memory slot. By delaying sending the next message whenever identifying an indicator that a memory slot is being read, and by referencing each memory slot sequentially, the publisher ensures that it does not overtake any of the subscribers. Further, by removing backpressure on the channel, the system can reduce latency in communication speed resulting from ensuring reliable communication to the subscribers. For example, while delaying sending the next message, the publisher may continuously monitor for an event trigger, and check the next sequential memory slot directly after receiving the event trigger.

Within examples, the methods and systems can operate with different classes of subscriber. Subscribers of a first type may correspond to components or tasks of the robot that require more complete information from the publisher. Subscribers of a second type may correspond to components or tasks of the robot that do not require complete information from the publisher. The subscriber types may both read messages over the same channel, but may interact differently with the publisher. For example, subscribers of the first type may increment the indicator at each memory slot while reading respective messages, and may remove backpressure on the channel using an event trigger after completing a read operation, while subscribers of the second type may neither increment the indicators nor send the event triggers. Communicating in this manner can increase communication speed by reducing the number of subscribers that cause the publisher to delay sending a next message.

Within examples, subscribers are created after the publisher is created, and map to the shared memory after the shared memory is allotted for the publisher. In order to allow the subscribers to read each message while also triggering the publisher to send messages in a timely manner, a server can send an activation message for the subscribers to read in an activation memory slot that sequentially precedes a starting memory slot of the publisher. The publisher begins sending messages after the activation message has been read and the indicator is decremented, ensuring that the publisher does not overwrite messages during a startup operation of a given task.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller(s) 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller(s) 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
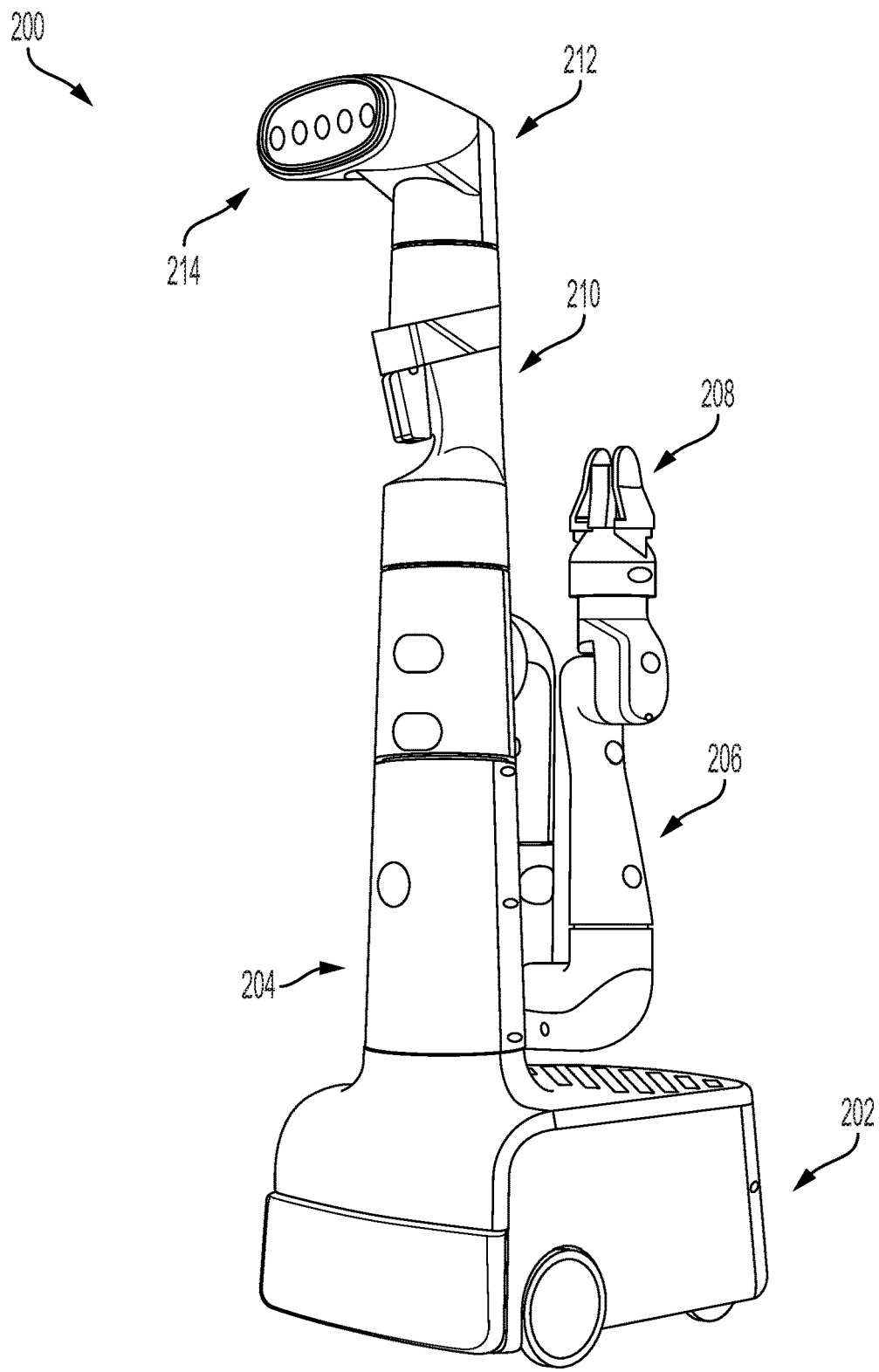
FIG. 2 illustrates a mobile robot, in accordance with example embodiments.
Figure 3:
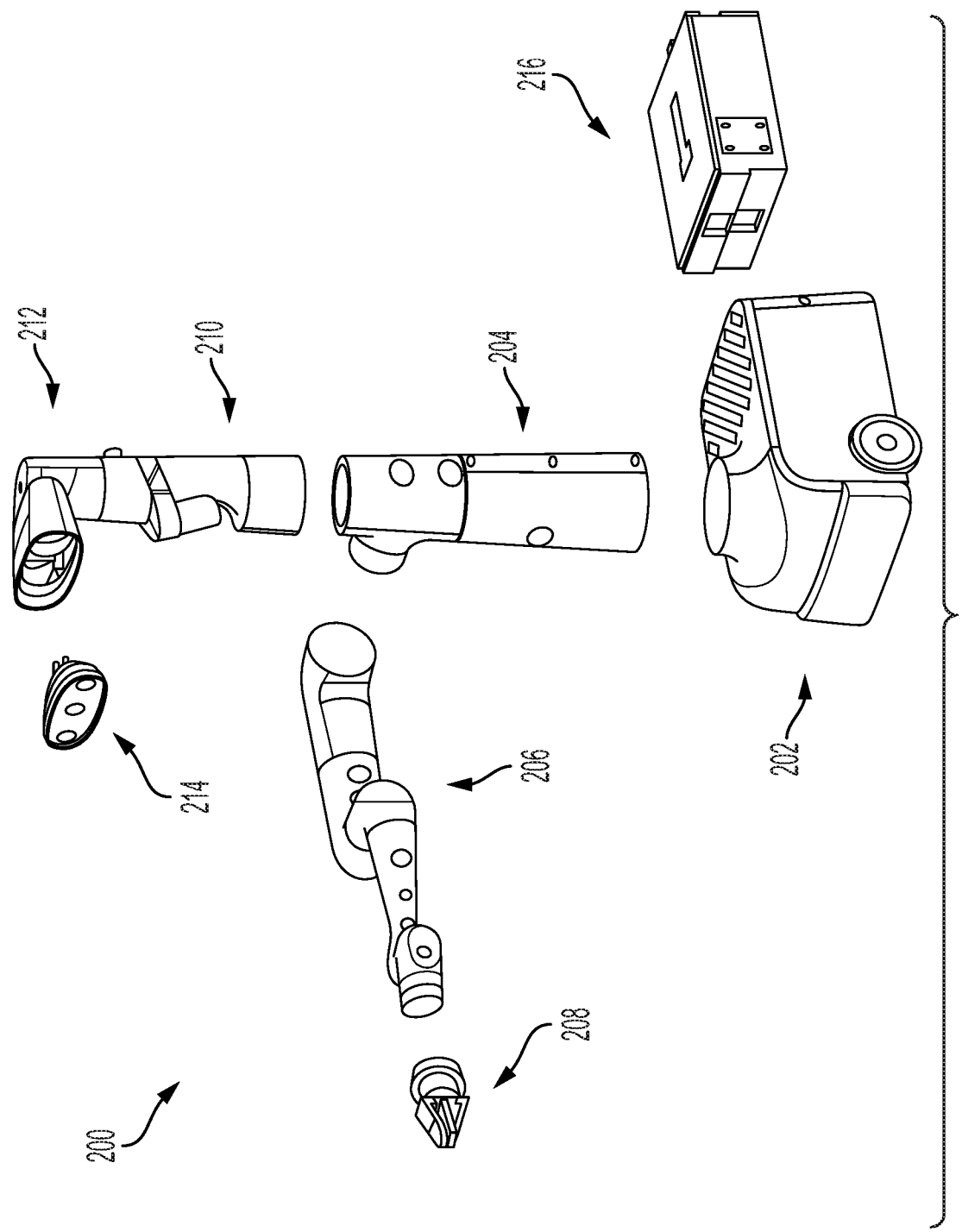
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be fixed relative to the mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a 3D LIDAR sensor configured to collect depth information about the environment. The 3D LIDAR sensor may be coupled to a carved-out portion of the mast 210 and fixed at a downward angle. The LIDAR position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared(IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination. In some examples, the perception suite 214 may also include a projector configured to project images and/or video into the environment.

Figure 4:
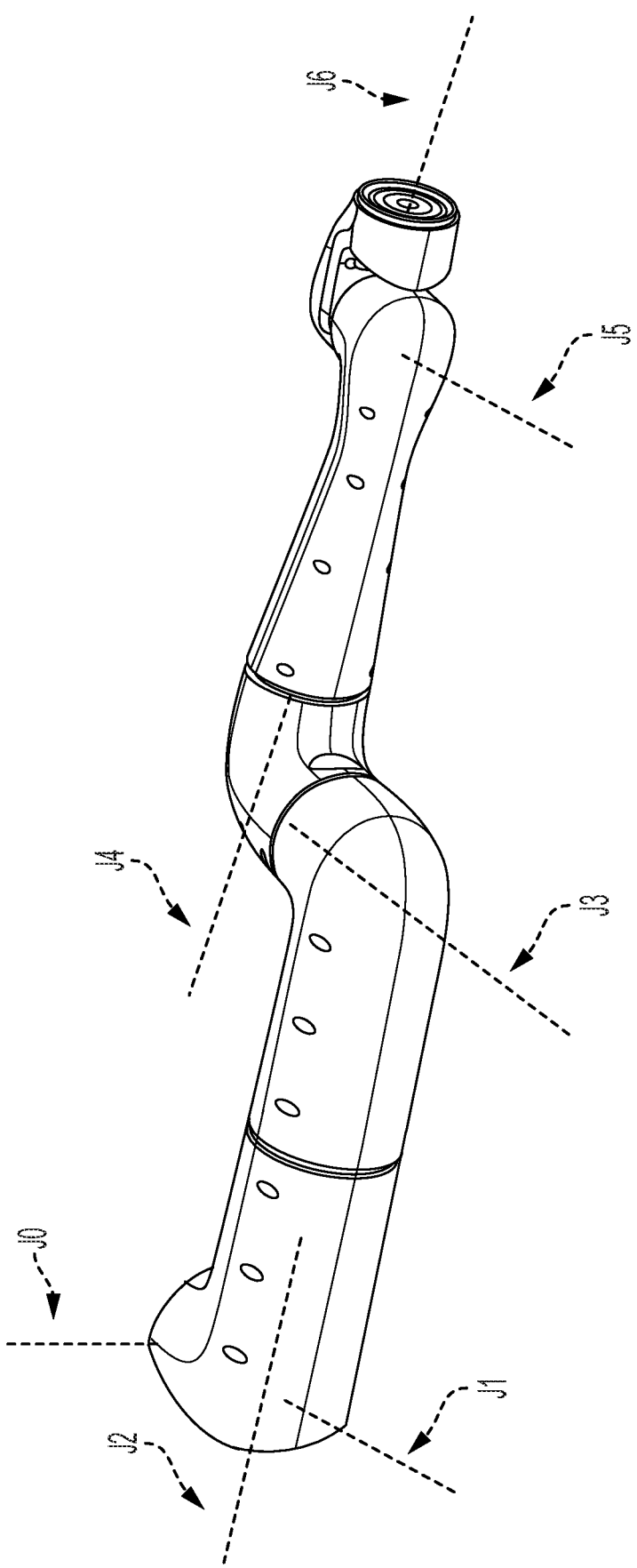
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5:
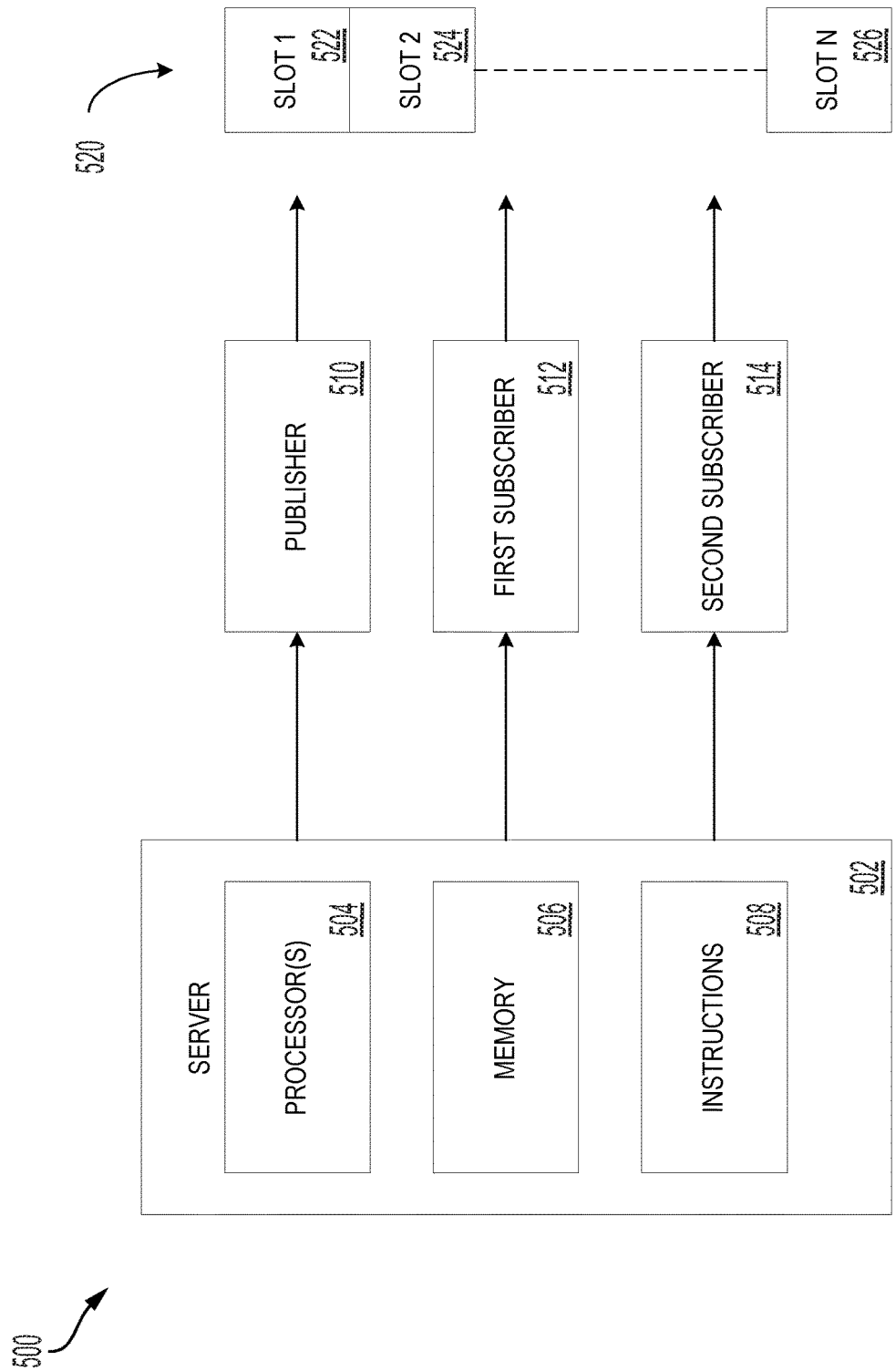
FIG. 5 is a block diagram of a system, in accordance with example embodiments.

FIG. 5 is a block diagram of a system 500, in accordance with example embodiments. In particular, FIG. 5 shows a server 502, a publisher 510, a first subscriber 512, a second subscriber 514, and a shared memory 520.

Server 502 includes one or more processor(s) 504, a memory 506, and instructions 508.

Processor(s) 504 may operate as one or more general-purpose hardware processors or special purpose hardware processors (e.g., digital signal processors, application specific integrated circuits, etc.). Processor(s) 504 may be configured to execute computer-readable program instructions (e.g., instructions 508), which may be stored in memory 506. Processor(s) 504 may also directly or indirectly interact with other components of system 500 or other systems or components (e.g., robotic system 100, sensor(s) 112, power source(s) 114, mechanical components 110, or electrical components 116).

Memory 506 may be one or more types of hardware memory. For example, Memory 506 may include or take the form of one or more computer-readable storage media that can be read or accessed by processor(s) 504. The one or more computer-readable storage media can include volatile or non-volatile storage components, such as optical, magnetic, organic, or another type of memory or storage, which can be integrated in whole or in part with processor(s) 504. In some implementations, memory 506 can be a single physical device. In other implementations, memory 506 can be implemented using two or more physical devices, which may communicate with one another via wired or wireless communication. As noted previously, memory 506 may include computer-readable program instructions (e.g., instructions 508).

Server 502 is configured for facilitating communication within system 500, and in some examples can more generally facilitate communication within robotic system 100. Facilitating communications may involve sending control instructions to aspects of the robot, and organizing communication between these aspects based on a protocol, such as an inter-process communication (IPC) protocol. Server 502 may perform operations responsive to the instantiation of a task, such as moving a component of a robot or obtaining sensor data by a sensor.

Carrying out tasks may involve communication (e.g., control instructions or sensor data) between two or more components of the robot, such as computing devices, sensors, actuators, movable components (e.g., arm 206), software modules, or other aspects of the robot that are configured to send and/or receive information. Server 502 designates a sending component (e.g., a sensor that is obtaining sensor data) as the "publisher" for a given task and designates one or more receiving components as "subscribers" (e.g., a robot controller) that read messages from the publisher on a shared memory. The server may designate a publisher and one or more subscribers during a "communication session" that lasts for a predetermined period of time, until a task is completed, or until a particular event is detected (e.g., the robot switches to another task). Processor(s) 504 can execute instructions 508 to carry out such operations. Further details regarding these communication operations are provided below with respect to FIGS. 6A-6F, FIG. 7, and FIG. 8.

Server 502, and system 500 more generally, can be incorporated into one or more other systems, such as robotic system 100. For example, server 502 can be the same as control system 118 of robotic system 100 or be incorporated into robotic system 100 as a subsystem for communication operations. Server 502 may be referred to more generally as a computing device.

Publisher 510 is a component that is designated by server 502 for sending information to first subscriber 512 and second subscriber 514 over a shared memory 520. Different subscribers may be designated as different subscriber types, and may interact differently with publisher 510. For example, first subscriber 512 may be designated as a first type of subscriber that corresponds to "reliable" communication between publisher 510 and first subscriber 512. As used herein within the context of communication, the term "reliable" refers to ensuring that a subscriber reads each message from a publisher while a given task is carried out. Second subscriber 514 may be designated as a second type of subscriber that corresponds to "unreliable" communication between publisher 510 and second subscriber 514. As used herein within the context of communication, the term "unreliable" refers to not ensuring that a subscriber reads each and every message from a publisher while a given task is carried out. Further details regarding different types of subscribers are described below with respect to FIGS. 6D-6E, and FIG. 8.

Shared memory 520 may be a portion (or multiple portions) of memory that is set aside by server 502 or publisher 510 specifically for use by publisher 510 while a given task is carried out. Any subscriber assigned to publisher 510 can read messages from publisher 510 over shared memory 520. Shared memory 520 includes memory slots 522, 524, and 526. Each memory slot is sequentially related, meaning that a first slot 522 precedes a second slot 524, which proceeds a third slot and so on, until reaching an n-th slot 526 in shared memory 520. The n-th slot 526, in turn, may precede first slot 522 to create a conceptual loop of memory. Publisher 510, first subscriber 512, and second subscriber 514 may each traverse the memory slots sequentially to send and read messages respectively.

Figure 6A:
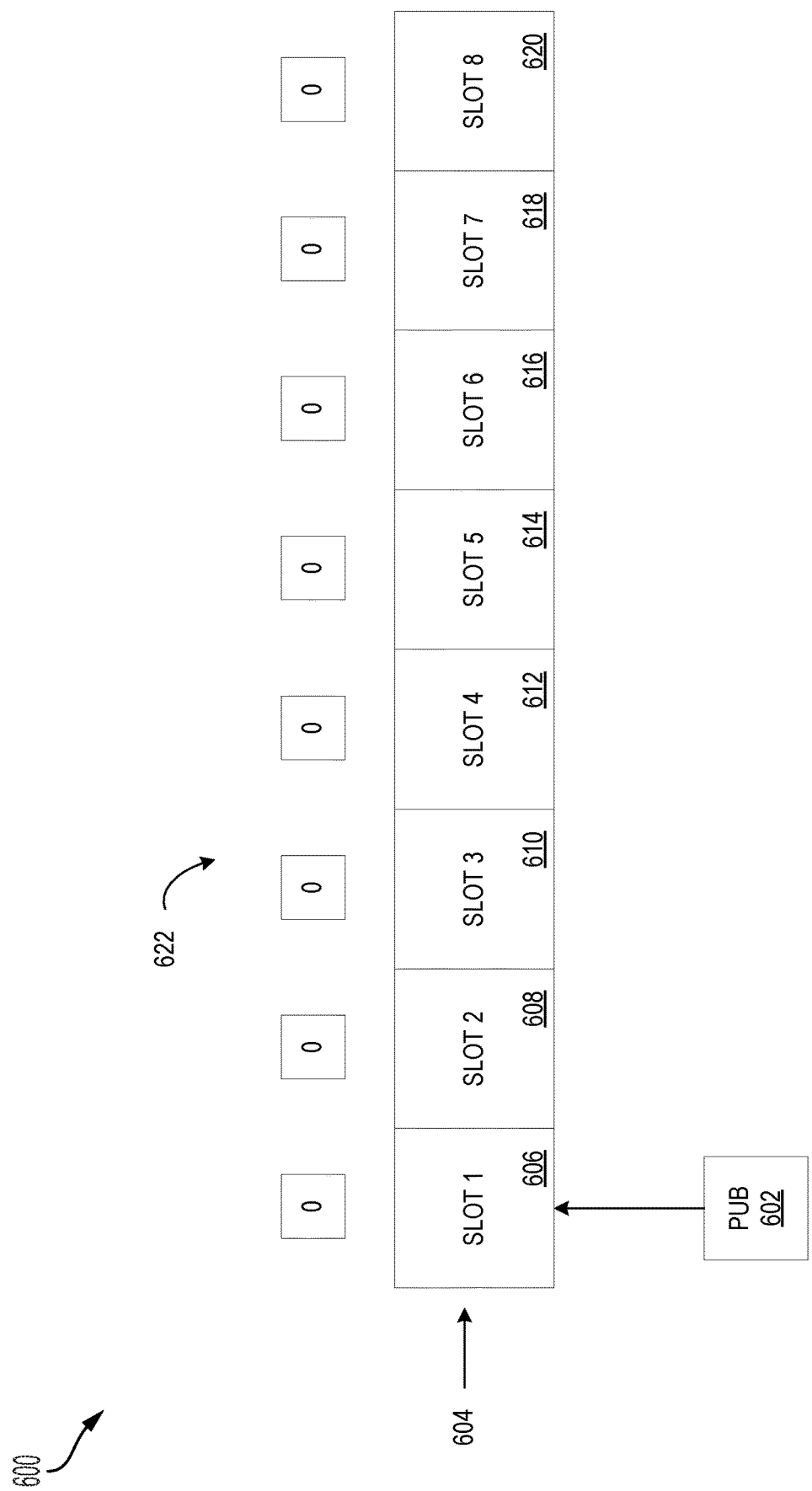
FIG. 6A illustrates a communication session at a first time, in accordance with example embodiments.

FIG. 6A illustrates a communication session 600 at a first time, in accordance with example embodiments. Communication session 600 may be instantiated in response to a scheduled task, such as a task of a robot. A computing device, such as server 502 may instantiate communication session 600. When communication session 600 begins, a publisher 602 is created for sending messages over a channel having a shared memory 604. In this context, it should be understood that the publisher is a component of the system (e.g., a sensor or controller of a robot), and "creating" the publisher refers to designating the component for sending messages during a particular communication session. In some examples, the publisher might not physically correspond to a hardware component of the system, but rather can be a software-based proxy for the given component that is created by the server in order to facilitate communication from the component to other components in the system.

The shared memory 604 can be reserved by the server or by publisher 602. The shared memory 604 includes a plurality of sequentially-related memory slots configured to store messages from publisher 602. As shown in FIG. 6A, the shared memory includes a first memory slot 606, a second memory slot 608, a third memory slot 610, a fourth memory slot 612, a fifth memory slot 614, a sixth memory slot 616, a seventh memory slot 618, and an eighth memory slot 620. The memory slots are sequentially related, meaning that first memory slot 606 precedes second memory slot 608, second memory slot 608 precedes third memory slot 610, and so on until reaching eighth memory slot 620, which precedes first memory slot 606. Publisher 602 cycles through the sequentially-related memory slots in accordance with a protocol to publish messages to be read by subscribers.

Shared memory 604 is associated with a plurality of indicators 622, which each correspond to a given memory slot. The indicators 622 indicate whether a subscriber is currently referencing a memory slot and reading a message. Indicators 622 are used to prevent publisher 602 from sending a message in certain contexts, which are described further below with respect to FIGS. 6B-6F. Because there are no subscribers shown in FIG. 6A, each indicator is set to "0" indicating that zero subscribers are reading a message in the time slot.

Figure 6B:
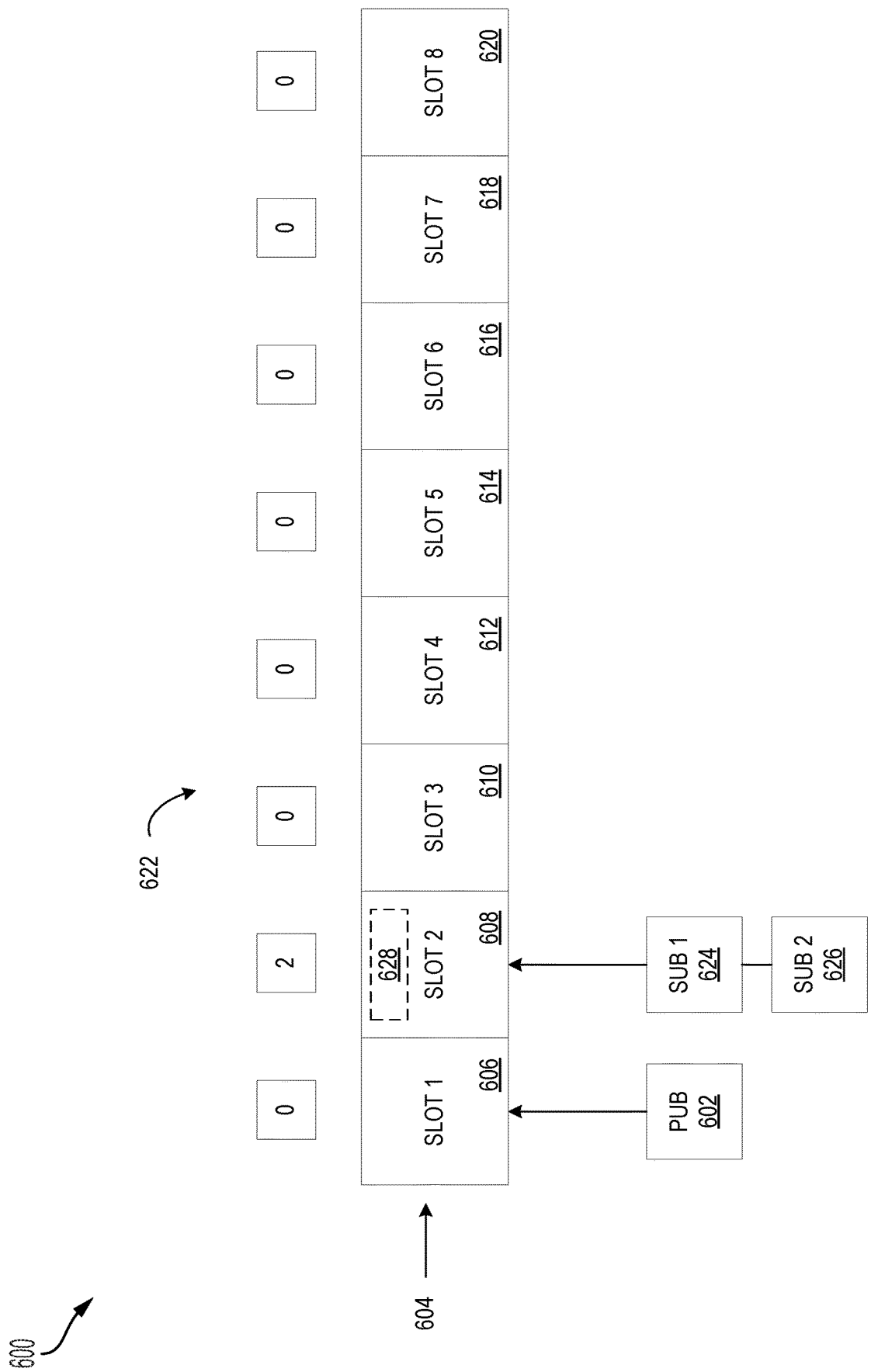
FIG. 6B illustrates a communication session at a second time, in accordance with example embodiments.

FIG. 6B illustrates the communication session 600 at a second time, in accordance with example embodiments. At the second time, the server creates a first subscriber 624 and a second subscriber 626.

Within examples, publisher 602 is prevented from publishing messages on shared memory 604 until one or more subscribers are created. This prevents publisher 602 from overwriting any messages on shared memory 604 before the subscribers are able to read them, and ensures that the subscribers can read each message sent by publisher 602. Any messages that the publisher creates while it waits to send the messages can be stored in a buffer.

FIG. 6B shows an activation message 628 stored in second memory slot 608 after creating first subscriber 624 and second subscriber 626. Activation message 628 can be sent by the server to alert publisher 602 that the server has created all subscribers for communication session 600. At the second time depicted in FIG. 6B, first subscriber 624 and second subscriber 626 have referenced second memory slot 608, causing an indicator to increment from "0" to "2," which indicates that two subscribers are reading a message. Reading the activation message causes the publisher to begin sending messages, as described below with respect to FIG. 6C.

Figure 6C:
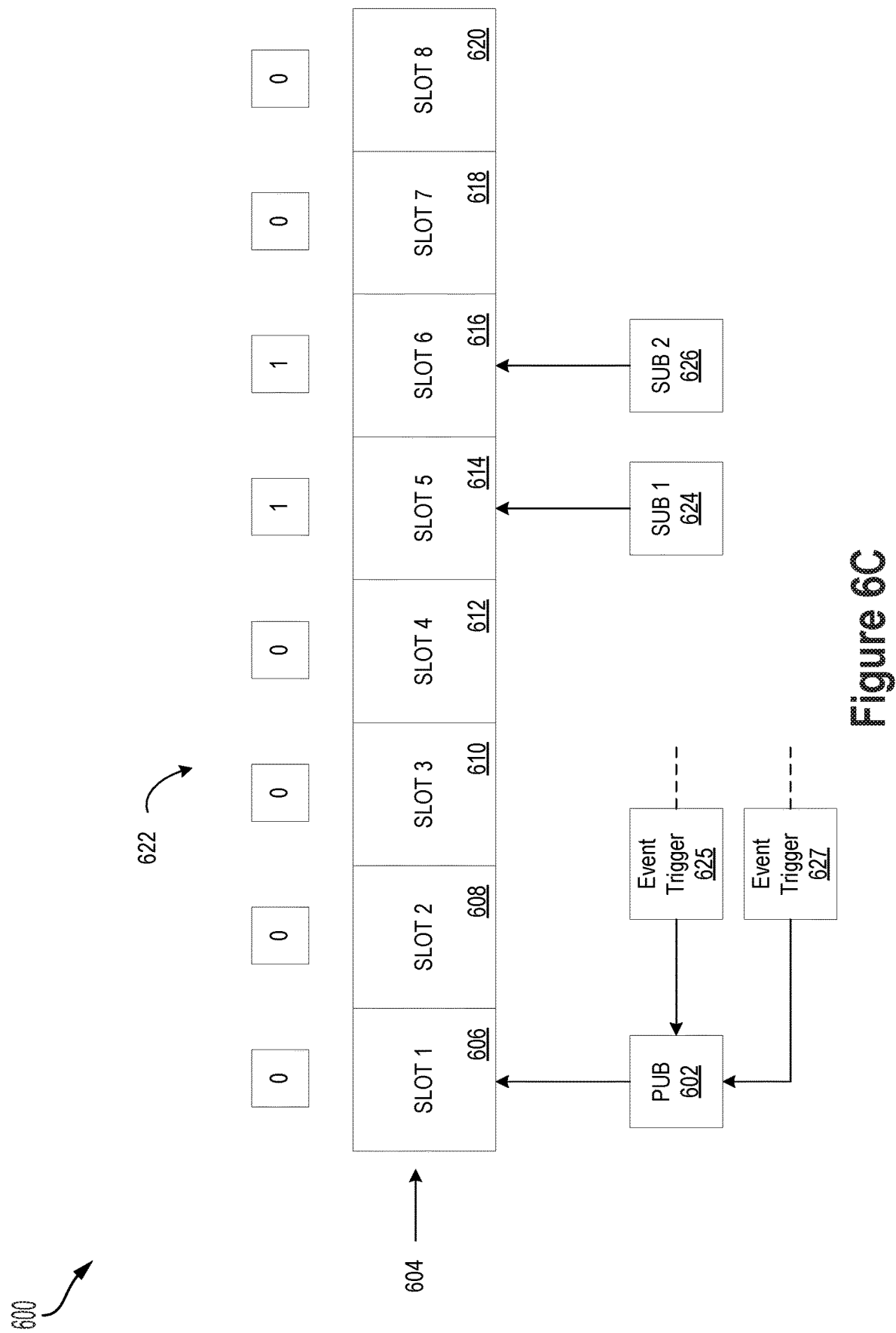
FIG. 6C illustrates a communication session at a third time, in accordance with example embodiments.

FIG. 6C illustrates the communication session 600 at a third time, in accordance with example embodiments. At the third time, first subscriber 624 and second subscriber 626 have finished reading the activation message and have respectively sent a first event trigger 625 and a second event trigger 627 to publisher 602 to indicate that a message has been read. This prompts publisher 602 to begin sending messages over the channel. In some examples, this may operate as a special case where publisher 602 is set to begin sending messages only after receiving a set number of event triggers indicating that all subscribers have read activation message 628. In other examples, publisher 602 might always wait to send messages until receiving an event trigger, which prompts publisher 602 to traverse shared memory 604 in search of a usable memory slot.

As shown in FIG. 6C, first subscriber 624 is referencing fifth memory slot 614 and the corresponding indicator of indicators 622 shows "1." Similarly, second subscriber 626 is referencing sixth memory slot 616 and the corresponding indicator shows "1." Because there are no messages in fifth memory slot 614 and sixth memory slot 616, the subscribers may traverse to the next sequential memory slot quickly relative to the publisher (e.g., the publisher may send messages at 25 to 50 kHz).

Figure 6D:
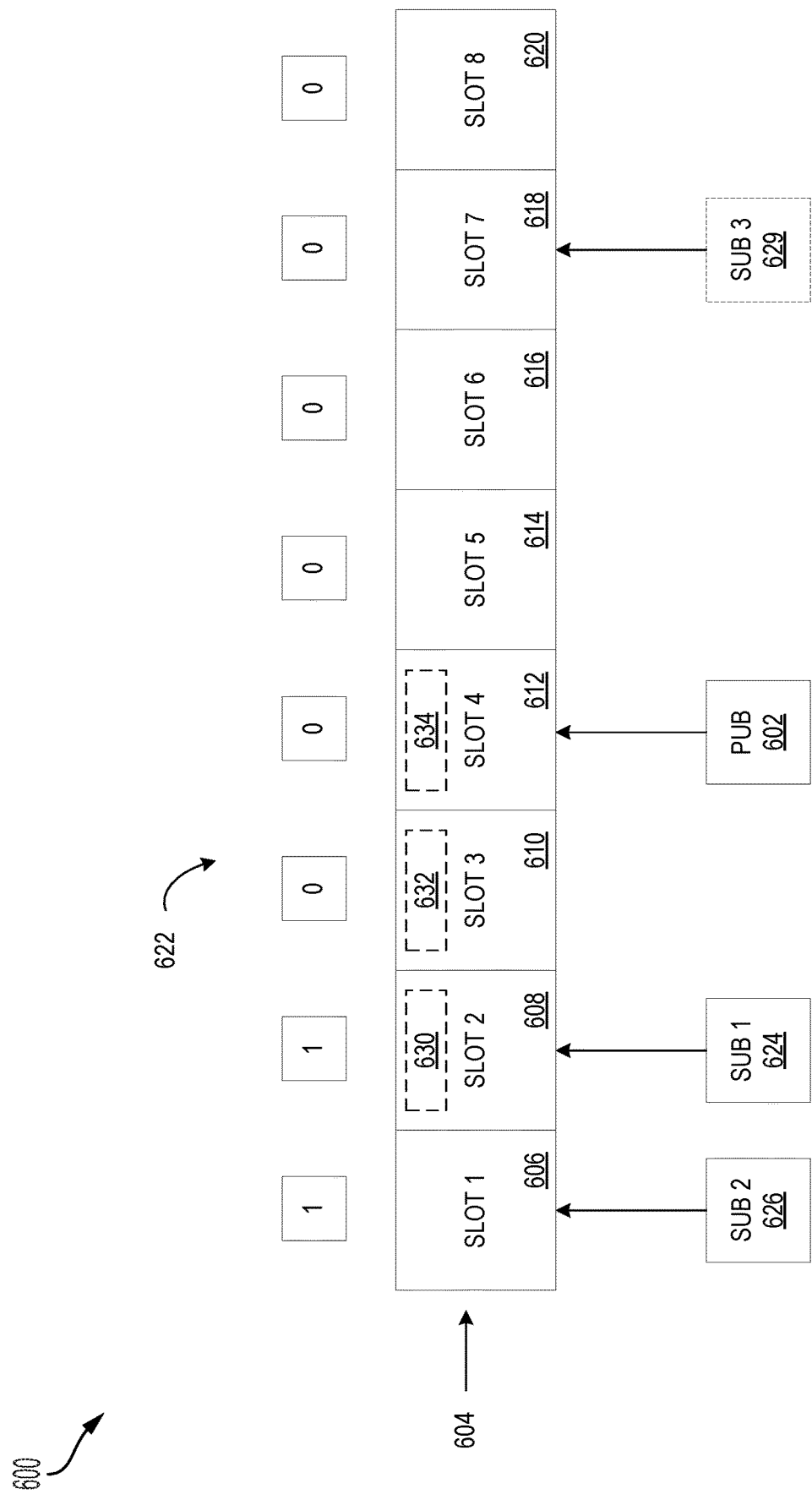
FIG. 6D illustrates a communication session at a fourth time, in accordance with example embodiments.

FIG. 6D illustrates the communication session 600 at a fourth time, in accordance with example embodiments. At the fourth time, publisher 602 has received event triggers 625 and 627, and has responsively started to send messages over the channel. In particular, publisher 602 has sequentially moved from first memory slot 606 to second memory slot 608 to send message 630, moved to third memory slot 610 to send message 632, and moved to fourth memory slot 612 to send message 634. At each of these sequentially-related memory slots, publisher 602 sends the message based on a determination that an indicator for the respective memory slot has zero subscribers reading the message. As shown in FIG. 6D, first subscriber 624 has progressed to second memory slot 608 and is reading message 630 at the fourth time, while second subscriber 626 has not yet progressed to second memory slot 608. As first subscriber 624 and second subscriber 626 traverse through the sequential memory slots and read messages, they provide event triggers that indicate to publisher 602 that it may continue to send messages. However, publisher 602 might not monitor for the event triggers until it reaches a memory slot with an incremented indicator showing that a subscriber is reading a message at that memory slot. This is described further below with respect to FIG. 6F.

FIG. 6D also shows a third subscriber 629 to illustrate an example scenario involving subscribers of different types. In the example scenario, first subscriber 624 and second subscriber 626 are designated as a first type of subscriber that ensures reliable communication between publisher 602 and the first subscriber 624 and second subscriber 626. Because first subscriber 624 and second subscriber 626 are designated as the first type of subscriber, they are ensured to read each message from publisher 602. Further, third subscriber 629 is designated as a second type of subscriber that does not ensure reliable communication between publisher 602 and third subscriber 629. Because third subscriber 629 is designated as the second type of subscriber, it is not ensured to read each message from publisher 602. This is illustrated in FIG. 6D because the indicator for seventh memory slot 618 shows "0." Thus, the second type of subscriber does not prevent publisher 602 from publishing messages, even if that results in publisher 602 overwriting a message that third subscriber 629 is reading (in FIG. 6D, third subscriber 629 is not reading a message).

The server may designate a subscriber type for each subscriber based on one or more criteria. These criteria may include a type of task associated with communication session 600, a type of component associated with publisher 602, a type of component associated with a given subscriber, or a combination of these factors.

For example, the server may determine that a type of task associated with communication session 600 is critical to operation of the system (e.g., autonomous navigation of the robot), and so may designate all subscribers in the communication session under the first type of subscriber. Determining whether a task is critical may be based on predetermined categories of tasks stored in memory (e.g., priority levels of different tasks may be stored in memory 506).

In another example, the server may determine that a publisher will send critical information (e.g., LIDAR data, control signals from a robot controller, post-processing information from a software module indicating whether an obstacle has been detected, or a manual override instruction from a user of the robot) to one or more subscribers, and so may designate some or all subscribers in the communication session under the first type of subscriber. Determining whether information is critical may be based on predetermined categories of publishers and/or message types stored in memory (e.g., priority levels of different publishers and/or message types associated with particular components of the robot may be stored in memory 506).

In other examples, the server may determine that a given subscriber (e.g., a robot controller) should receive complete information from a particular type of publisher (e.g., a servo in an arm of the robot), and so designate this subscriber under the first type of subscriber. By contrast, the server may determine that another subscriber (e.g., a position logging module of the robot) should not necessarily receive complete information from the particular type of publisher, and so designate this subscriber under the second type of subscriber. Determining whether a subscriber should receive complete information may be based on predetermined categories of subscribers and publishers (e.g., priority levels of different combinations of publishers and subscribers associated with particular components of the robot may be stored in memory 506).

Within examples, the criteria for determining a subscriber type for each subscriber may manifest as a loss function that promotes high-priority tasks, publishers, and combinations of components in the system, and subscriber types may be assigned based on loss function scores for each subscriber relative to a threshold score. In other examples, each designation may be predetermined based on one or more of these criteria.

Figure 6E:
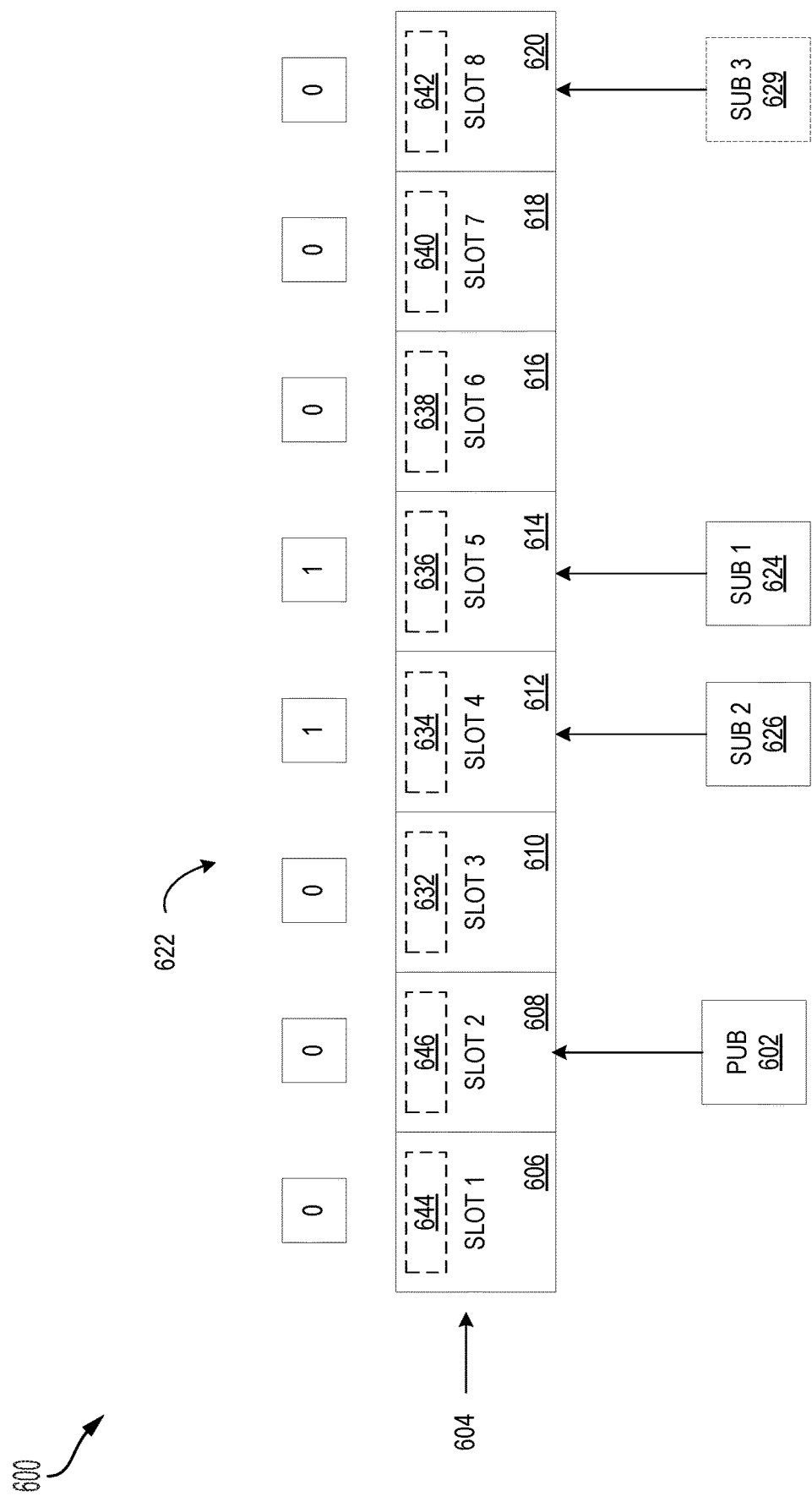
FIG. 6E illustrates a communication session at a fifth time, in accordance with example embodiments.

FIG. 6E illustrates the communication session 600 at a fifth time, in accordance with example embodiments. At the fifth time, publisher 602 has traversed from fourth memory slot 612 to second memory slot 608, and sent messages 636, 638, 640, 642, 644, and 646. Because the indicator corresponding to second memory slot 608 is not incremented, publisher 602 overwrites message 630 with message 646.

FIG. 6E shows that publisher 602 passed third subscriber 629 in shared memory 604 because third subscriber 629 is designated as the second type of subscriber that does not increment the indicators corresponding to each memory slot, and thus does not prevent publisher 602 from sending messages or progressing to next sequential memory slots. Further, first subscriber 624 has traversed from second memory slot 608 to fifth memory slot 614 and second subscriber 626 has traversed from first memory slot 606 to fourth memory slot 612. As first subscriber 624 and second subscriber 626 traverse through the sequential memory slots and read messages, they provide event triggers that indicate to publisher 602 that it may continue to send messages.

Figure 6F:
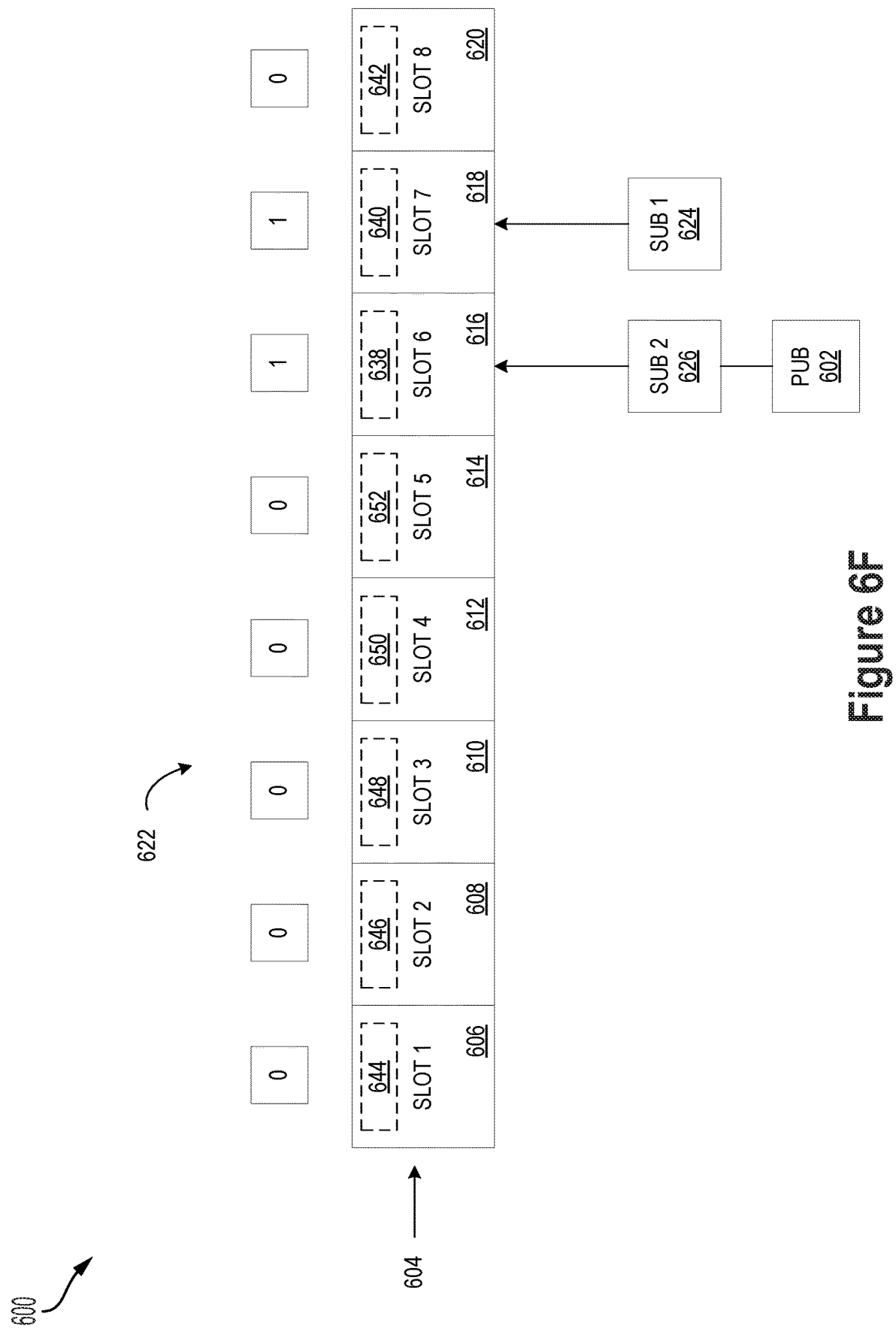
FIG. 6F illustrates a communication session at a sixth time, in accordance with example embodiments.

FIG. 6F illustrates the communication session 600 at a sixth time, in accordance with example embodiments. At the sixth time, publisher 602 has traversed from second memory slot 608 to sixth memory slot 616 and published messages 648, 650, and 652. Further, first subscriber 624 has traversed from fifth memory slot 614 to seventh memory slot 618, and second subscriber 626 has traversed from fourth memory slot 612 to sixth memory slot 616. Because the indicator corresponding to sixth memory slot 616 is incremented while second subscriber 626 reads message 638, publisher 602 delays sending a next message at sixth memory slot 616. While publisher 602 delays sending the next message, it monitors for an event trigger. Once second subscriber 626 completes reading message it will send an event trigger to publisher 602, causing publisher 602 to check sixth memory slot 616 to determine whether the corresponding indicator shows zero subscribers are reading message 638. In this manner, the subscribers remove backpressure on the channel to reduce any delays associated with ensuring that subscribers read each message sent by publisher 602.

FIG. 6A-6F show an example sequence of sent and received messages over a channel. It should be understood that different configurations of shared memory, publishers, and subscribers are possible. Any N-to-M configuration of publishers and subscribers can be implemented in accordance with FIGS. 6A-6F and their corresponding description. Further, though the sequence of sent and received messages is described in the context of a robotic system, similar implementations are possible in other systems with a plurality of interconnected sources of information that are directed by a server and/or computing device. Still further, while certain operations are described as being carried out by a publisher or a subscriber (e.g., the publisher sending a message, a subscriber sending an event trigger, or an indicator of a memory slot incrementing or decrementing), some or all of these operations may be facilitated or carried out by the server, a communication module of a system-wide controller, or a dedicated computing device or software module.

FIG. 7 is a block diagram of a communication session 700 between computing devices, in accordance with example embodiments. In particular, communication session 700 is carried out between a first computing device 702 associated with sending messages and a second computing device 710 associated with receiving messages. This configuration may be implemented in a network environment with physically separate devices (e.g., between two or more devices in a manufacturing facility, or between separate modules in the same device).

First computing device 702 includes a server 704, a publisher 706, and a shared memory 708. One or more subscribers (not depicted) may also exist on first computing device 702, and may read messages over shared memory 708 in a similar manner to that described above with respect to FIGS. 5, and 6A-6F.

Second computing device 710 includes a server 712, a subscriber 714, and a shared memory 716. One or more messages 718 are sent from publisher 706 to subscriber 714 by way of a server link 720 between server 704 and server 712 and shared memory 716. In particular, when publisher 706 sends a message to shared memory 708, server 704 reproduces the message over server link 720, server 712 relays the message to shared memory 716, and subscriber 714 reads the message on shared memory 716. Accordingly, server 712 acts as a publisher on second computing device 710 that copies the messages sent by publisher 706, and shared memory 716 effectively stores the same information as shared memory 708. Further, indicators that are incremented by subscriber 714 while reading the message on shared memory 716, and event triggers sent by subscriber 714 after reading the message are relayed to publisher 706 and shared memory 708 by way of server 704. In this manner, the system can avoid overwriting messages that subscriber 714 has not read, and ensure that subscriber 714 reads each message sent by publisher 706.

Though FIG. 7 only shows a communication session between a first computing device and a second computing device, other configurations including at least one computing device associated with a publisher and a plurality of computing devices associated with a plurality of subscribers may also be implemented. In these implementations, the server link would connect servers from each computing device in the communication session, allowing each computing device to maintain a substantially matching shared memory and also allowing the at least one publisher to delay sending messages based on the subscribers reading each message from the at least one publisher.

Figure 8:
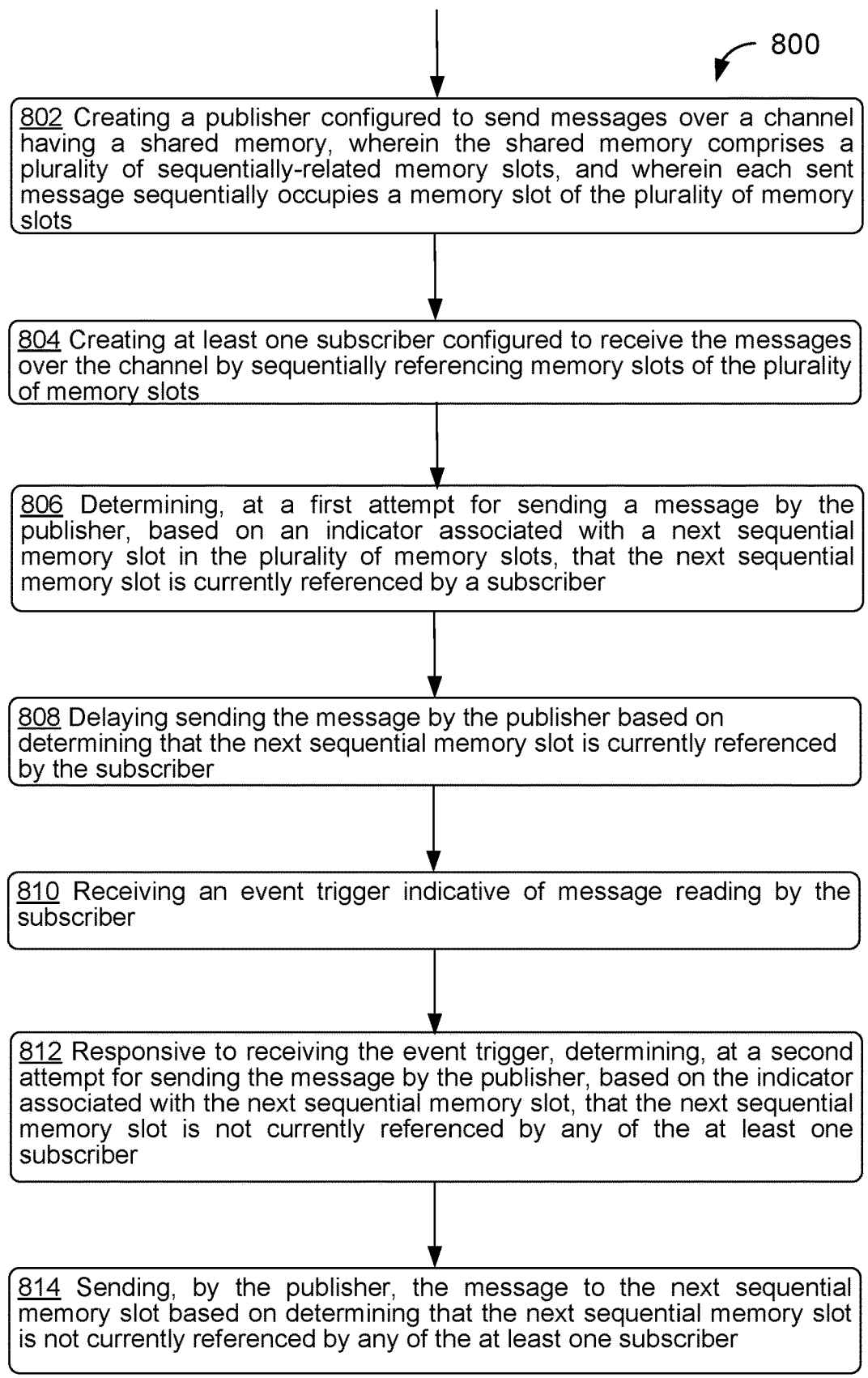
FIG. 8 is a block diagram of a method, in accordance with example embodiments.

FIG. 8 is a block diagram of a method, in accordance with example embodiments. In some examples, method 800 of FIG. 8 may be carried out by a control system, such as control system 118 of robotic system 100 or a computing device such as server 502 of system 500. In further examples, method 800 may be carried by one or more processors, such as processor(s) 102 and/or processor(s) 504, executing program instructions, such as computer-readable program instructions 106 and/or instructions 508, stored in a data storage, such as data storage 104 and/or memory 506. Execution of method 800 may involve a robotic device, such as illustrated and described with respect to FIGS. 1-4, or another system. Other robotic devices may also be used in the performance of method 800. In further examples, some or all of the blocks of method 800 may be performed by a control system remote from the robotic device or from system 500. In yet further examples, different blocks of method 800 may be performed by different control systems, located on and/or remote from a robotic device or from system 500.

At block 802, method 800 includes creating a publisher configured to send messages over a channel having a shared memory. The shared memory includes a plurality of sequentially-related memory slots, and each sent message sequentially occupies a memory slot of the plurality of memory slots. For example, the shared memory can be configured similarly to that depicted in FIGS. 5, and 6A-6F, and the publisher may sequentially traverse the shared memory as depicted in FIGS. 6A-6F.

At block 804, method 800 includes creating at least one subscriber configured to receive the messages over the channel by sequentially referencing memory slots of the plurality of memory slots. For example, the at least one subscriber may sequentially traverse the shared memory as depicted in FIGS. 6A-6F.

At block 806, method 800 includes determining, at a first attempt for sending a message by the publisher, based on an indicator associated with a next sequential memory slot in the plurality of memory slots, that the next sequential memory slot is currently referenced by a subscriber. For example, this may correspond to the scenario depicted in FIG. 6F.

At block 808, method 800 includes delaying sending the message by the publisher based on determining that the next sequential memory slot is currently referenced by the subscriber. For example, this may correspond to waiting for second subscriber 626 to complete reading message 638.

At block 810, method 800 includes receiving an event trigger indicative of message reading by the subscriber. For example, this may correspond to second subscriber 626 sending an event trigger after reading message 638.

At block 812, method 800 includes responsive to receiving the event trigger, determining, at a second attempt for sending the message by the publisher, based on the indicator associated with the next sequential memory slot, that the next sequential memory slot is not currently referenced by any of the at least one subscriber. For example, this may correspond to determining that the indicator corresponding to sixth memory slot 616 is decremented to show zero subscribers are reading message 638.

At block 814, method 800 includes sending, by the publisher, the message to the next sequential memory slot based on determining that the next sequential memory slot is not currently referenced by any of the at least one subscriber. For example, this may correspond to publisher 602 overwriting message 638 with another message.

Within examples, the message is a first message of a plurality of messages (e.g., a first message sent after sending message 652). In these examples, method 800 further includes sending a second message to another sequential memory slot while the at least one subscriber reads the first message. For example, publisher 602 may continue sending one or more messages while the at least one subscriber traverses shared memory 604 and reaches the first message).

Within examples, method 800 further includes, while delaying sending the message, monitoring for the event trigger. In these examples, determining that the next sequential memory slot is not currently referenced by any of the at least one subscriber includes checking the indicator associated with the next sequential memory slot directly after receiving the event trigger. In this manner, delays associated with reliable communication can be minimized.

Within examples, creating the at least one subscriber includes sending an activation message to the at least one subscriber over the channel prior to the publisher sending the message. For example, sending the activation message can be performed in a similar manner as described above with respect to activation message 628 shown in FIG. 6B.

Within examples, the at least one subscriber is of a first type of subscriber. The first type of subscriber is configured to change indicators for respective memory slots while referencing each respective memory slot. In these examples, method 800 further includes creating at least one additional subscriber of a second type. The second type of subscriber is not configured to change indicators for respective memory slots while referencing each respective memory slot. For example, the first type of subscriber may be associated with a first priority level for receiving information from the publisher, and the second type of subscriber may be associated with a second priority level for receiving information that is lower than the first priority level.

Within examples, method 800 further includes determining a subscriber type for the at least one subscriber based on a task of the publisher. In these examples, the task of the publisher can correspond to a task of a robot. The robot can perform a plurality of tasks, wherein each task can correspond to a priority level (e.g., associated with a predetermined category of the task). In these examples, determining the subscriber type for the at least one subscriber includes determining the subscriber type based on a priority level the task. For example, performing a precise movement of an arm of the robot may have a higher priority level than obtaining sensor data in some contexts. Determining the subscriber type may be further based on a type of component associated with the publisher, a type of component associated with the subscriber, or a combination of these criteria.

Within examples, method 800 further includes, for each respective memory slot, incrementing an indicator for the respective memory slot while the subscriber reads a particular message stored in the respective memory slot, and decrementing the indicator after the subscriber moves to another sequential memory slot in the shared memory. In these examples, method 800 may further include, for each respective memory slot having a stored message, sending an event trigger indicating message reading by the subscriber concurrently with decrementing the indicator for the respective memory slot. For example, this may be performed as shown in FIGS. 6A-6F.

Within examples, the message is a second message of a plurality of messages. In these examples, method 800 includes, prior to determining that the next sequential memory slot is currently referenced by the subscriber, determining based on an indicator associated with a preceding sequential memory slot in the plurality of memory slots, that the preceding sequential memory slot is not currently referenced by the subscriber, and sending a first message to the preceding sequential memory slot. For example, this may corresponding to publisher 602 sending message 652 prior to sending the next message to sixth memory slot 616 as shown in FIG. 6F.

Within examples, the publisher is associated with a first computing device and the at least one subscriber is associated with a second computing device. For example, the publisher may correspond to publisher 706 and the subscriber may correspond to subscriber 714 depicted in FIG. 7. In these examples, the shared memory can include a first shared memory on the first computing device and a second shared memory on the second computing device, and the second shared memory can match the first shared memory. For example, the first shared memory may correspond to shared memory 708 and the second shared memory may correspond to shared memory 716. In these examples, method 800 may further include establishing a link (e.g., server link 720) between a first server of the first computing device and a second server of the second computing device. Sending the message to the next sequential memory slot can include sending the message to a memory slot in the first shared memory, and sending the message to a corresponding memory slot in the second shared memory. For example, this may be performed as described above with respect to FIG. 7.

Though the functions described with respect to method 800 generally refer to robot operations, it should be understood that similar functionality can be implemented in other communication systems, such as vehicle systems, imaging systems, remote networked systems, Internet of Things (IoT) implementations, or other systems involving N-to-M communication.

CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:
1. A method comprising:
    creating a publisher configured to send messages over a channel having a shared memory, wherein the shared memory comprises a plurality of sequentially-related memory slots, and wherein each sent message sequentially occupies a memory slot of the plurality of memory slots;
    creating at least one subscriber configured to receive the messages over the channel by sequentially referencing memory slots of the plurality of memory slots;
    determining, at a first attempt for sending a message by the publisher, based on an indicator associated with a next sequential memory slot in the plurality of memory slots, that the next sequential memory slot is currently referenced by a subscriber;

delaying sending the message by the publisher based on determining that the next sequential memory slot is currently referenced by the subscriber;
receiving an event trigger indicative of message reading by the subscriber;
responsive to receiving the event trigger, determining, at a second attempt for sending the message by the publisher, based on the indicator associated with the next sequential memory slot, that the next sequential memory slot is not currently referenced by any of the at least one subscriber; and
sending, by the publisher, the message to the next sequential memory slot based on determining that the next sequential memory slot is not currently referenced by any of the at least one subscriber.

2. The method of claim 1, wherein the message is a first message of a plurality of messages, the method further comprising:
sending a second message to another sequential memory slot while the at least one subscriber reads the first message.

3. The method of claim 1, further comprising:
while delaying sending the message, monitoring for the event trigger,
wherein responsive to receiving the event trigger, determining that the next sequential memory slot is not currently referenced by any of the at least one subscriber comprises checking the indicator associated with the next sequential memory slot directly after receiving the event trigger.

4. The method of claim 1, wherein creating the at least one subscriber comprises sending an activation message to the at least one subscriber over the channel prior to the publisher sending the message.

5. The method of claim 1, wherein the at least one subscriber is of a first type of subscriber, wherein the first type of subscriber is configured to change indicators for respective memory slots while referencing each respective memory slot, the method further comprising:
creating at least one additional subscriber of a second type, wherein the second type of subscriber is not configured to change indicators for respective memory slots while referencing each respective memory slot.

6. The method of claim 1, further comprising:
determining a subscriber type for the at least one subscriber based on a task associated with the publisher.

7. The method of claim 6, wherein the task of the publisher corresponds to a task of a robot, wherein the robot performs a plurality of tasks, wherein each task corresponds to a priority level, and wherein determining the subscriber type for the at least one subscriber comprises determining the subscriber type based on a priority level the task.

8. The method of claim 1, further comprising, for each respective memory slot:
incrementing an indicator for the respective memory slot while the subscriber reads a particular message stored in the respective memory slot; and
decrementing the indicator after the subscriber moves to another sequential memory slot in the shared memory.

9. The method of claim 8, further comprising, for each respective memory slot having a stored message:
sending an event trigger indicating message reading by the subscriber concurrently with decrementing the indicator for the respective memory slot.

10. The method of claim 1, wherein the message is a second message of a plurality of messages, further comprising, prior to determining that the next sequential memory slot is currently referenced by the subscriber:
determining based on an indicator associated with a preceding sequential memory slot in the plurality of memory slots, that the preceding sequential memory slot is not currently referenced by the subscriber; and
sending a first message to the preceding sequential memory slot.

11. The method of claim 1, wherein the publisher is associated with a first computing device, and the at least one subscriber is associated with a second computing device.

12. The method of claim 11, wherein the shared memory comprises a first shared memory on the first computing device and a second shared memory on the second computing device, wherein the second shared memory matches the first shared memory.

13. The method of claim 12, further comprising:
establishing a link between a first server of the first computing device and a second server of the second computing device,
wherein sending the message to the next sequential memory slot comprises:
sending the message to a memory slot in the first shared memory; and
sending the message to a corresponding memory slot in the second shared memory.

14. A system comprising:
one or more processors;
a non-transitory computer readable medium; and
program instructions stored on the non-transitory computer readable medium and executable by the one or more processors to:
create a publisher configured to send messages over a channel having a shared memory, wherein the shared memory comprises a plurality of sequentially-related memory slots, and wherein each sent message sequentially occupies a memory slot of the plurality of memory slots;
create at least one subscriber configured to receive the messages over the channel by sequentially referencing memory slots of the plurality of memory slots;
determine, at a first attempt for sending a message by the publisher, based on an indicator associated with a next sequential memory slot in the plurality of memory slots, that the next sequential memory slot is currently referenced by a subscriber;
delay sending the message by the publisher based on determining that the next sequential memory slot is currently referenced by the subscriber;
receive an event trigger indicative of message reading by the subscriber;
responsive to receiving the event trigger, determine, at a second attempt for sending the message by the publisher, based on the indicator associated with the next sequential memory slot, that the next sequential memory slot is not currently referenced by any of the at least one subscriber; and
send, by the publisher, the message to the next sequential memory slot based on determining that the next sequential memory slot is not currently referenced by any of the at least one subscriber.

15. The system of claim 14, wherein the message is a first message of a plurality of messages, the program instructions being further executable to:
send a second message to another sequential memory slot while the at least one subscriber reads the first message.

16. The system of claim 14, the program instructions being further executable to:
while delaying sending the message, monitor for the event trigger,
wherein responsive to receiving the event trigger, determine that the next sequential memory slot is not currently referenced by any of the at least one subscriber comprises checking the indicator associated with the next sequential memory slot directly after receiving the event trigger.

17. The system of claim 14, the program instructions being further executable to send an activation message to the at least one subscriber over the channel prior to the publisher sending the message.

18. The system of claim 14, wherein the at least one subscriber is of a first type of subscriber, wherein the first type of subscriber is configured to change indicators for respective memory slots while referencing each respective memory slot, the program instructions being further executable to:
create at least one additional subscriber of a second type, wherein the second type of subscriber is not configured to change indicators for respective memory slots while referencing each respective memory slot.

19. The system of claim 14, further comprising a robot, wherein the one or more processors are comprised within the robot.

20. A non-transitory computer readable medium having stored therein instructions executable by one or more processors to cause a computing system to perform functions comprising:
creating a publisher configured to send messages over a channel having a shared memory, wherein the shared memory comprises a plurality of sequentially-related memory slots, and wherein each sent message sequentially occupies a memory slot of the plurality of memory slots;
creating at least one subscriber configured to receive the messages over the channel by sequentially referencing memory slots of the plurality of memory slots;
determining, at a first attempt for sending a message by the publisher, based on an indicator associated with a next sequential memory slot in the plurality of memory slots, that the next sequential memory slot is currently referenced by a subscriber;
delaying sending the message by the publisher based on determining that the next sequential memory slot is currently referenced by the subscriber;
receiving an event trigger indicative of message reading by the subscriber;
responsive to receiving the event trigger, determining, at a second attempt for sending the message by the publisher, based on the indicator associated with the next sequential memory slot, that the next sequential memory slot is not currently referenced by any of the at least one subscriber; and
sending, by the publisher, the message to the next sequential memory slot based on determining that the next sequential memory slot is not currently referenced by any of the at least one subscriber.

\* \* \* \* \*